United States Patent [19]

Strobl

[11] Patent Number: 5,012,149

[45] Date of Patent: Apr. 30, 1991

[54] ASSEMBLED COMMUTATOR FOR AN ELECTRIC MOTOR

[75] Inventor: Georg Strobl, Repulse Bay, Hong Kong

[73] Assignee: Johnson Electric S.A., La Chaux de Fonds, Switzerland

[21] Appl. No.: 298,028

[22] Filed: Jan. 18, 1989

[30] Foreign Application Priority Data

| | | | |
|---|---|---|---|
| Jan. 19, 1988 | [GB] | United Kingdom | 8801093 |
| Feb. 15, 1988 | [GB] | United Kingdom | 8803444 |

[51] Int. Cl.[5] .......... H02K 13/04

[52] U.S. Cl. .......... 310/234; 310/233; 310/42

[58] Field of Search .......... 310/71, 233, 234, 235, 310/236

[56] References Cited

U.S. PATENT DOCUMENTS

| | | | |
|---|---|---|---|
| 4,342,933 | 8/1982 | Gerlach et al. | 310/234 |
| 4,469,972 | 9/1984 | Rampignon et al. | 310/233 |
| 4,705,648 | 11/1987 | Reichert et al. | 524/439 |
| 4,956,572 | 9/1990 | Strobl | 310/233 |

FOREIGN PATENT DOCUMENTS

| | | | |
|---|---|---|---|
| 2312646 | 9/1974 | Fed. Rep. of Germany . | |
| 59-25550 | 2/1984 | Japan | 310/233 |

OTHER PUBLICATIONS

European Search Report Dated Oct. 13, 1989.

*Primary Examiner*—Steven L. Stephan
*Assistant Examiner*—Judson H. Jones
*Attorney, Agent, or Firm*—Fleit, Jacobson, Cohn, Price, Holman & Stern

[57] ABSTRACT

An assembled commutator comprises a base carrying segments. Each segment 16 has a connector portion with a wall portion having an aperture to locate the connector portion about a projection on a collar formed on the base, to locate the segment. The connector portions each have a U-shaped portion having a radially inner arm which rests on the collar and is wider than the radially outer arm, to form wings which can be used when hot forging a tang to an armature coil wire, with a first electrode bearing down on the arm and a second electrode bearing down on the wings.

6 Claims, 1 Drawing Sheet

ASSEMBLED COMMUTATOR FOR AN ELECTRIC MOTOR

INTRODUCTION

The present invention relates to an assembled commutator for an electric motor, and in particular to an assembled commutator for a fractional horsepower permanent magnet direct current motor.

BACKGROUND

One type of assembled commutator comprises a preformed plastic base on which a plurality of segments is mounted. The segments are formed locked to the base, for example by providing tongues on the segments which are received in recesses in the base. Each segment has a connector portion which extends radially outwards and has a U-shaped portion supported by a collar on the base. To connect an armature coil to the segment, the coil wire is wrapped into the base of the U-shape which is then collapsed onto the wire and heated in a hot forging or resistance welding process to burn off the insulation covering on the wire and form an electrical and mechanical connection with the wire. A first electrode is brought down onto the U-shaped part and a second bears on the brush contacting portion. This may result in distortion of the base in the region of the brush contacting portions.

SUMMARY OF THE INVENTION

A first aspect of the present invention provides an assembled commutator comprising a pre-formed base, a plurality of commutator segments mounted on the base, each segment comprising a brush contacting portion and a U-shaped connector portion for receiving a wire of an armature coil of an electric motor, wherein a radially outer arm of said U-shaped connector portion is narrower in the circumferential direction of said commutator than the radially inner arm of said U-shaped portion.

In this way, the connector portion can be hot forged to the wire by bringing a first electrode down onto the radially outer arm of the U-shape to urge it against the radially inner arm, and a second electrode is brought down onto the radially inner arm at a position circumferentially adjacent the outer arm, such that current flow will be limited to the region of the connector portion.

The radially inner arm may be an extension of the brush contacting portion of the segment in the plane of the brush contacting portion or it may be supported on a collar on the base.

A second aspect of the present invention provides an assembled commutator comprising a pre-formed cylindrical base, the base comprising a cylindrical portion having a collar at one end, a plurality of commutator segments mounted on the base, each segment comprising a brush contacting portion which is supported by the cylindrical portion of the base and a generally radially extending connector portion which is supported by the collar, wherein an aperture is formed in said connector portion and a projection is provided on the collar, the projection being received in the aperture to locate the segment on the base in the region of the collar.

BRIEF DESCRIPTION OF THE DRAWINGS

The invention will be further described by way of example with reference to the accompanying drawings, in which.

DESCRIPTION OF THE PREFERRED EMBODIMENT

Figure 1:
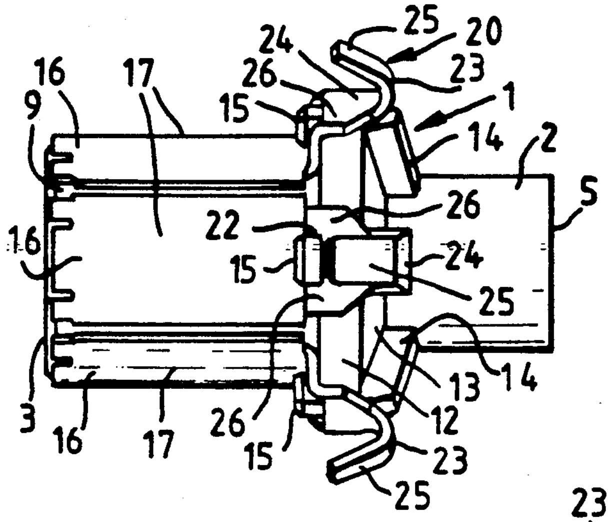
FIG. 1 is a side view of an assembled commutator in accordance with the invention.
Figure 2:
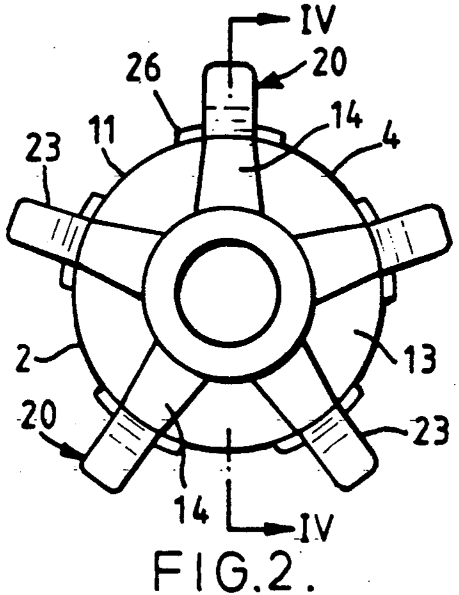
FIG. 2 is an end view of the commutator of FIG. 1.
Figure 3:
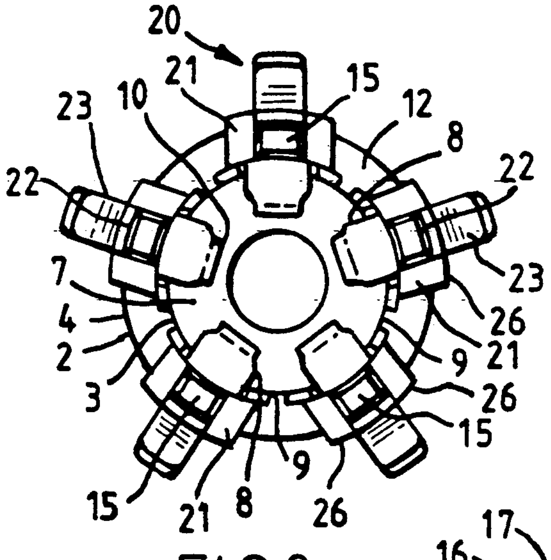
FIG. 3 is a view of the other end of the commutator of FIG. 1.

The drawings show an embodiment of an assembled commutator 1 constructed in accordance with the invention. The commutator 1 comprises an electrically insulating base 2 which is integrally moulded from plastic material, preferably a crystalline polymer material. One such material is marketed under the trade name XYDAR sold by DARTCO Manufacturing Co. of the U.S.A. The base 2 comprises a cylindrical portion 3 having a collar 4 formed at one end, and a stub-like extension 5 extending beyond the collar 4. The base 2 has a cylindrical inner bore 6 for mounting on a motor shaft (not shown). An end wall 7 of the cylindrical portion 3 opposite the collar 4 has recesses 8 which connect the outer surface 9 of the portion 3 with apertures 10 extending into the base from the end wall 7.

The collar 4 is generally cylindrical and has a circumferential outer surface 11, a radially extending front wall 12 and a radially extending rear wall 13. Five, evenly spaced buttresses 14 are formed on the rear wall 13. Five evenly spaced cuboid projections 15 are formed on the front wall 12. The projections 15 are spaced from the outer surface 9 of the cylindrical portion 1 and level with the outer circumferential surface 11 of the collar 4.

Figure 4:
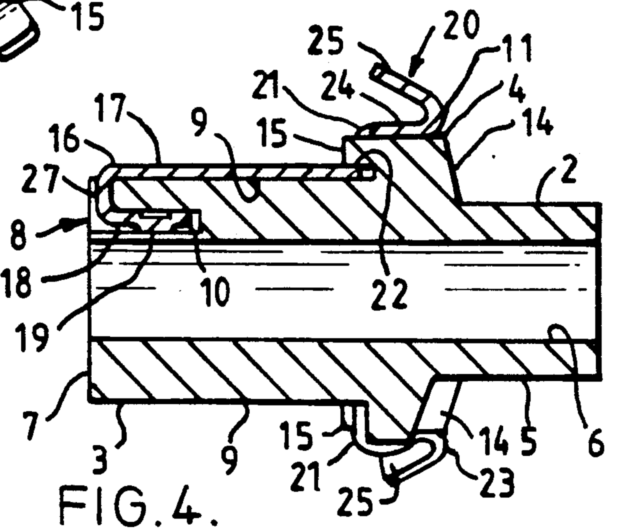
FIG. 4 is a cross-section along the line IV—IV of FIG. 2.

The base 2 carries five commutator segments 16. The segments are stamped from copper sheet and folded to shape. Each segment comprises an arcuate brush contacting portion 17 which sits on the surface 9. A reentrant tab 27 is formed at a front end of the portion 17. Tab 27 sits in a respective recess 8 and projects into an aperture 10. Ends 18 of the tabs 27 have a detent 19 to wedge the ends in the respective apertures 10 (FIG. 4).

A connector portion 20 is formed at the rear end of each brush contacting portion 17. A connector portion 20 comprises a radially extending wall 21 which is slightly narrower than the width of the brush contacting portion 17. As is clearly shown in FIG. 4, the radially extending wall 21 has an aperture 22 having a closed periphery which snugly receives a projection 15 spaced from the surface 9 of the cylindrical base portion 3 by the thickness of a portion of the brush contacting portion 17 of the segment 16, the portion of brush contacting segment portion 17 fitting between the projection 15 and the surface 9 of the cylindrical base portion 3. A U-shaped wire receiving portion 23 is formed at the outer end of the wall 21. This has a first, radially inner arm 24 which rests on the circumferential surface 11 of the collar 4 and a second, radially outer arm 25 extending at an acute angle to the first arm 24. The first arm 24 is wider than the second arm 25 in the circumferential direction such that it has two "wings" 26 which extend to either side of the second arm 25 when it is pressed down onto the first arm.

The segments 16 are spaced apart on the surface of the cylindrical portion 3.

To assemble the commutator the segments 16 are slid onto the base 2 along the surface 9. Ends 18 of the tabs 27 are pushed into the apertures 10, the wall portions 21 sliding over the projections 15. The base 1 has chamfered edges to facilitate the mounting of the segments 16. In use, the assembled commutator is mounted on a motor shaft, the extension 5 abutting the armature core. Coils are wound on the armature and the wire looped into respective U-shaped portions 23 at the end of each coil winding. The connector portions 20 are hot forged or resistance welded to the wire in the usual manner, but with a first electrode bearing on the arm 25, and, preferably, a forked second electrode bearing on the wings 26 of the arm 24. Hence, heat evolved during the forging process is largely limited to the region of the connector portion 20 and the collar 4.

It is usual to machine the surface of the segments 16 to ensure that the segments form a cylindrical surface to close tolerances. The walls 21 of the connector portions 20 cooperate with the projections 15 to limit circumferential movement of the segment ends against the collar 4 during machining, the tabs 27 fitting in the recesses 8 to limit movement at the other ends of the segments.

Various modifications may be made to the described embodiment and it is desired to include all such modifications as fall within the scope of the accompanying claims. For example, in a low profile commutator, the collar 4 may be omitted so that the arms 24 are in the plane of the brush contacting portions 17 and supported on an extension of the cylindrical part 3. The segments may be glued to the base part 3 to secure them on the base as the projections 15 will be absent.

What is claimed is:

1. An assembled commutator comprising a preformed cylindrical base, the base comprising a cylindrical portion having a collar at one end, a plurality of commutator segments mounted on the base, each segment comprising a brush contacting portion which is supported by the cylindrical portion of the base, and a generally radially extending connector portion for hot connection to an armature coil wire, the connector portion being supported by the collar, wherein an aperture is formed in said connector portion and a projection is provided on the collar, the projection being received in the aperture to locate the segment on the base in the region of the collar, wherein the projection is provided on a wall of the collar, the wall extending radially away from the cylindrical base portion, and wherein the projection is spaced from the cylindrical base portion by the thickness of a portion of the segment, with the portion of the segment fitting between the projection on the collar and the cylindrical base portion.

2. An assembled commutator comprising a preformed cylindrical base, the base comprising a cylindrical portion having a collar at one end, a plurality of commutator segments mounted on the base ,each segment comprising a brush contacting portion which is supported by the cylindrical portion of the base, and a generally radially extending connector portion for hot connection to an armature coil wire, the connector portion being supported by the collar, wherein an aperture having a closed periphery is formed in said connector portion and a projection is provided on the collar, the projection being received in the aperture to locate the segment on the base in the region of the collar, and wherein the connector portion comprises a U-shaped wire receiving portion, a first, radially inner arm of the U-shaped portion being supported by a circumferential surface of the collar.

3. A commutator as claimed in claim 2, wherein the first, radially inner arm of the U-shaped portion is wider in the circumferential direction than the other, radially outer arm of the U-shaped portion.

4. An assembled commutator as claimed in claim 1, wherein the aperture is formed in a radially extending wall of the connector portion and has a closed periphery.

5. An assembled commutator as claimed in claim 2, wherein the aperture is formed in a radially extending wall of said connector portion.

6. An assembled commutator as claimed in claim 5, wherein the projection on the collar is spaced from the cylindrical base portion by the thickness of a portion of the brush contacting portion of the segment, and the portion of the brush contacting portion of the segment is disposed between the projection on the collar and the cylindrical base portion.

* * * * *